United States Patent
Rulfi Fertilio (10) Patent No.: US 12,024,019 B2
(45) Date of Patent: Jul. 2, 2024

(54) HYBRID VEHICLE TRANSMISSION WITH A MECHANICAL REVERSE SYSTEM

(71) Applicant: DANA GRAZIANO S.R.L., Turin (IT)

(72) Inventor: Emanuele Rulfi Fertilio, Mondovì (IT)

(73) Assignee: DANA GRAZIANO S.R.L., Turin (IT)

(*) Notice: Subject to any disclaimer, the term of this patent is extended or adjusted under 35 U.S.C. 154(b) by 170 days.

(21) Appl. No.: 17/449,917

(22) Filed: Oct. 4, 2021

(65) Prior Publication Data
US 2023/0106079 A1    Apr. 6, 2023

(51) Int. Cl.
| | |
|---|---|
| F16H 3/00 | (2006.01) |
| B60K 6/36 | (2007.10) |
| B60K 6/387 | (2007.10) |
| B60K 6/44 | (2007.10) |
| B60K 6/547 | (2007.10) |
| B60K 6/48 | (2007.10) |
| B60T 1/00 | (2006.01) |

(52) U.S. Cl.
CPC ............... *B60K 6/36* (2013.01); *B60K 6/387* (2013.01); *B60K 6/44* (2013.01); *B60K 6/547* (2013.01); *B60K 2006/4825* (2013.01); *B60T 1/005* (2013.01); *B60Y 2200/92* (2013.01); *F16H 2200/006* (2013.01)

(58) Field of Classification Search
CPC . B60K 6/36; B60K 6/387; B60K 6/44; B60K 6/547; B60K 2006/4825; F16H 3/006; F16H 2200/006
USPC .................................................. 74/330, 661
See application file for complete search history.

(56) References Cited

U.S. PATENT DOCUMENTS

| | | | |
|---|---|---|---|
| 5,280,731 A | 1/1994 | Turpin | |
| 8,931,371 B2* | 1/2015 | Xie | B60K 6/48 |
| | | | 903/909 |
| 9,618,085 B2* | 4/2017 | Dzafic | B60K 6/547 |
| 10,166,973 B2* | 1/2019 | Yang | B60W 20/30 |
| 10,677,296 B2* | 6/2020 | Kimes | B60K 6/547 |
| 11,221,060 B2* | 1/2022 | Wafzig | B60K 6/48 |
| 2003/0001391 A1 | 1/2003 | Kuang et al. | |
| 2005/0139035 A1* | 6/2005 | Lee | B60W 10/113 |
| | | | 74/661 |
| 2006/0019784 A1 | 1/2006 | Sowul et al. | |
| 2007/0199393 A1* | 8/2007 | Hattori | F16H 3/093 |
| | | | 74/331 |
| 2007/0225097 A1 | 9/2007 | Raghavan et al. | |
| 2010/0063704 A1 | 3/2010 | Okubo et al. | |
| 2011/0263379 A1 | 10/2011 | Liang et al. | |

FOREIGN PATENT DOCUMENTS

| | | |
|---|---|---|
| DE | 202019100677 U1 | 5/2019 |
| EP | 1232891 A1 | 8/2002 |
| EP | 3363671 A1 | 8/2018 |
| GB | 2544061 A | 5/2017 |

* cited by examiner

*Primary Examiner* — Ha Dinh Ho
(74) *Attorney, Agent, or Firm* — McCoy Russell LLP (57) ABSTRACT

A transmission system is provided that includes a mechanical reverse assembly designed to selectively mechanically couple a reverse gearset to an output shaft of an electric machine and a first primary shaft. In the mechanical reverse assembly, a coupling device may be automatically shifted to attach the reverse gearset to the first primary shaft in a reverse drive configuration in any of a hybrid mode, a full electric vehicle (EV) mode, and a full internal combustion engine (ICE) mode.

13 Claims, 6 Drawing Sheets

HYBRID VEHICLE TRANSMISSION WITH A MECHANICAL REVERSE SYSTEM

TECHNICAL FIELD

The present description relates generally to a mechanical reverse assembly in a hybrid vehicle transmission and methods for operation thereof.

BACKGROUND & SUMMARY

Hybrid electric and all-electric vehicles have previously used motors that are designed to rotate in opposing directions to provide forward drive and electric reverse functionality. Using the electric reverse may allow a vehicle transmission to achieve a compact arrangement and forgo added complexity that results from the use of a reverse gearing arrangement in the transmission. However, the electric reverse may become inoperable when a traction battery has a low state of charge (SOC).

US 2011/0263379 A1 to Liang et al. discloses a hybrid vehicle powertrain which attempts to use a mechanical reverse in a power split transmission. The power split transmission uses a planetary gearset which enables the powertrain to be operated in both negative and positive power split modes. In Liang's powertrain, the mechanical reverse arrangement is coupled to a countershaft that is attached to an engine. The mechanical reverse arrangement therefore relies on engine power for operation.

The inventors have recognized several drawbacks with Liang's mechanical reverse arrangement. For instance, Liang's transmission provides limited reverse drive options, as the mechanical reverse drive is effected only using engine power. Additionally, the planetary gearset which facilitates the power split functionality is space inefficient when compared to automatic transmissions with discrete operating gears. Further, the complexity of the power split arrangement in the powertrain may increase the likelihood of powertrain component degradation.

To resolve at least a portion of the aforementioned drawbacks, a transmission system is provided. In one example, the transmission system includes a mechanical reverse assembly with a reverse gearset. The reverse gearset includes at least a first gear on a first primary shaft and a second gear that is torsionally coupled to an output shaft of an electric machine and a primary shaft. The mechanical reverse assembly further includes a coupling device, such as a dog clutch, shift sleeve, and/or synchronizer. Further, the coupling device is configured to, in a reverse drive configuration, mechanically attach the reverse gearset to the first primary shaft. In this way, a compact reverse arrangement may be efficiently incorporated into the transmission near the electric machine to simplify transmission manufacturing and maintenance.

In a further example, the reverse drive configuration may be implemented in any of a full electric vehicle mode, a full internal combustion engine mode, or a hybrid mode. In this way, the transmission system may effectively utilize the mechanical reverse assembly in the transmission's different operating modes, thereby expanding the window of reverse drive operation and potentially avoiding convoluted control strategies which may involve switching the system into an all-electric mode to allow the transmission to transition into an electric reverse mode.

In yet another example, the transmission system may include a park lock assembly coupled to a secondary shaft of the transmission parallel to the coupling device. Further, the park lock assembly is arranged at an end of the transmission away from the internal combustion engine. In this way, the park lock assembly may be efficiently integrated into the transmission to prevent unintended movement of the vehicle when the vehicle is brought to a stop without significantly impacting the overall package size of the transmission, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3-5C show power paths for different operating modes and gear ratio selections of the transmission system depicted in FIG. 1.

DETAILED DESCRIPTION

The following description relates to systems and methods for a hybrid vehicle transmission with a mechanical reverse arrangement. The transmission may include an internal combustion engine and an electric machine designed to operate in a hybrid mode, an all-electric mode, and a full internal combustion engine (ICE) mode. The transmission further includes a mechanical reverse assembly that can be engaged while the system is operating in each of the all-electric mode, the full ICE mode, and the hybrid mode. Consequently, the reliability of the system's mechanical reverse arrangement may be increased when compared to systems that rely solely on electric reverse and can be prone to inoperability when the traction battery has a relatively low state of charge (SOC). To achieve this highly adaptable mechanical reverse functionality, the reverse assembly may contain a driving gear idly mounted on a primary shaft, an idler gear, and a gear on an idler shaft of an electric motor. The reverse assembly may further include a coupling device that selectively couples the reverse geartrain to the primary shaft. In this way, the system can enter into mechanical reverse in any of the all-electric, full internal combustion engine, and hybrid operating modes.

Figure 1:
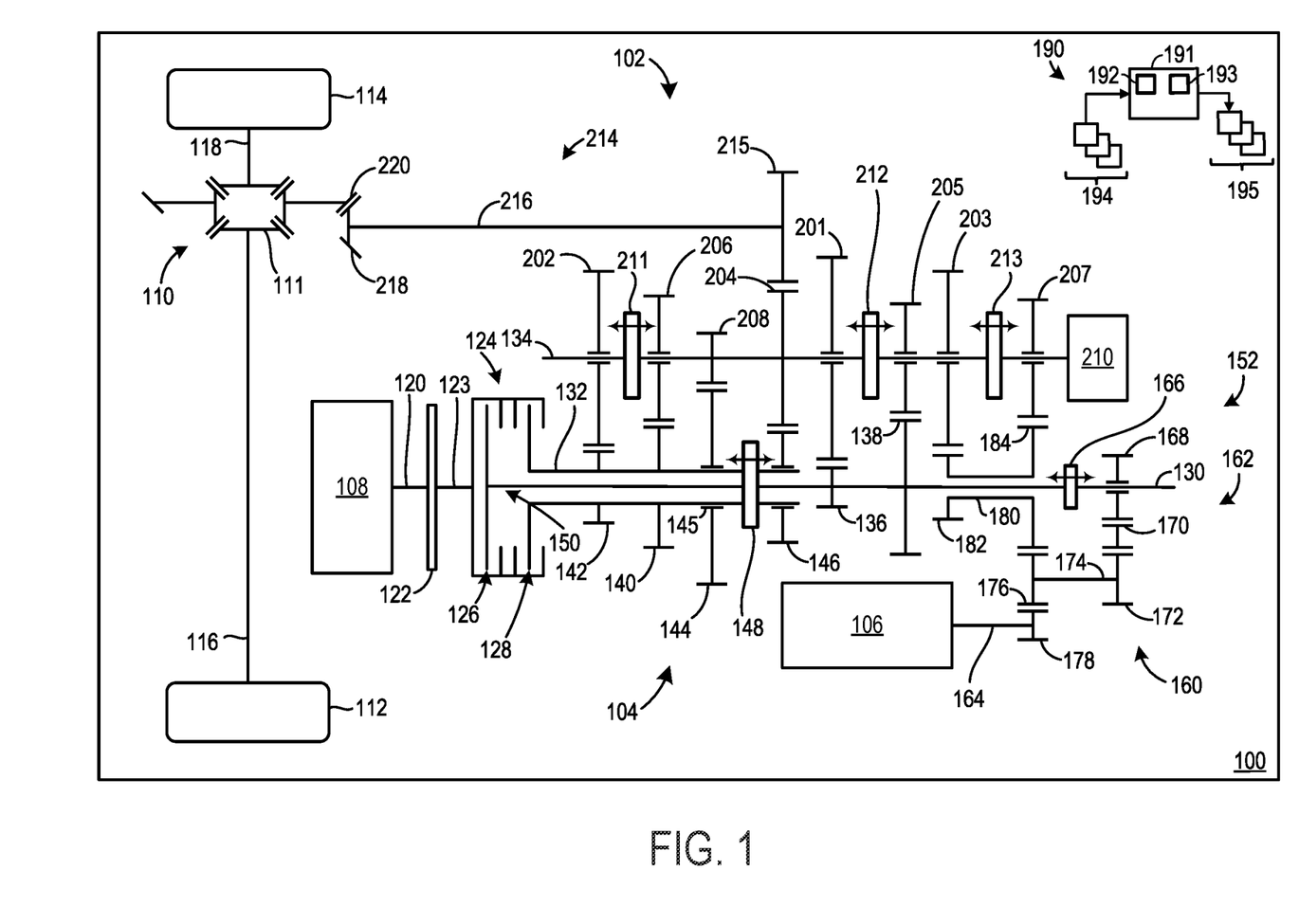
FIG. 1 is a schematic representation of a first example of a transmission system with a mechanical reverse assembly in a hybrid vehicle.
Figure 2A:
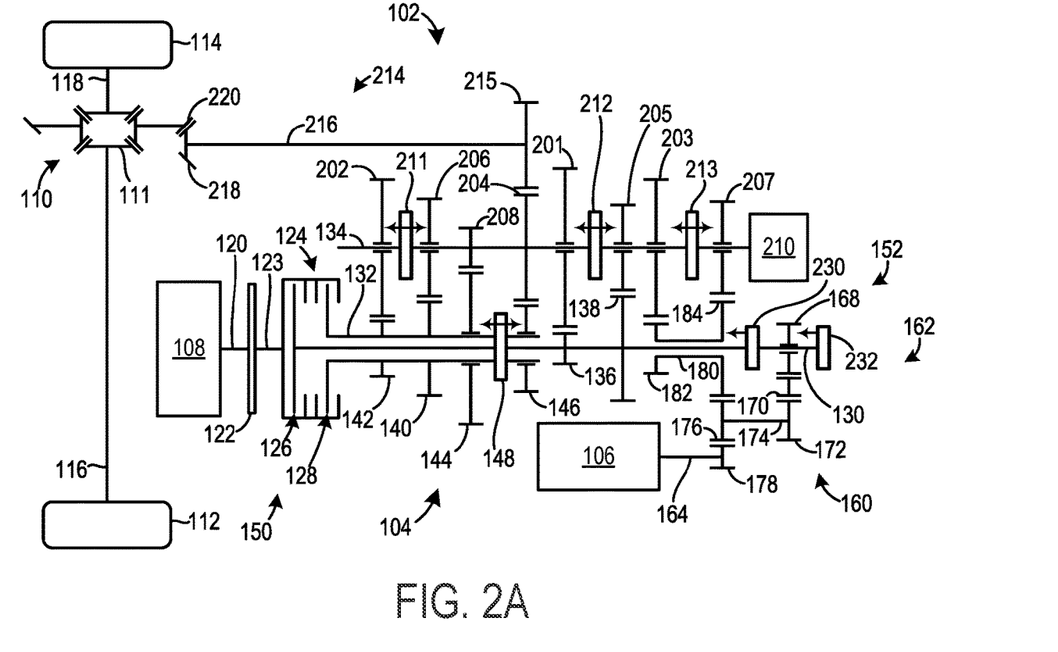
FIGS. 2A-2B show second and third examples of a transmission system with a mechanical reverse assembly.
Figure 2B:
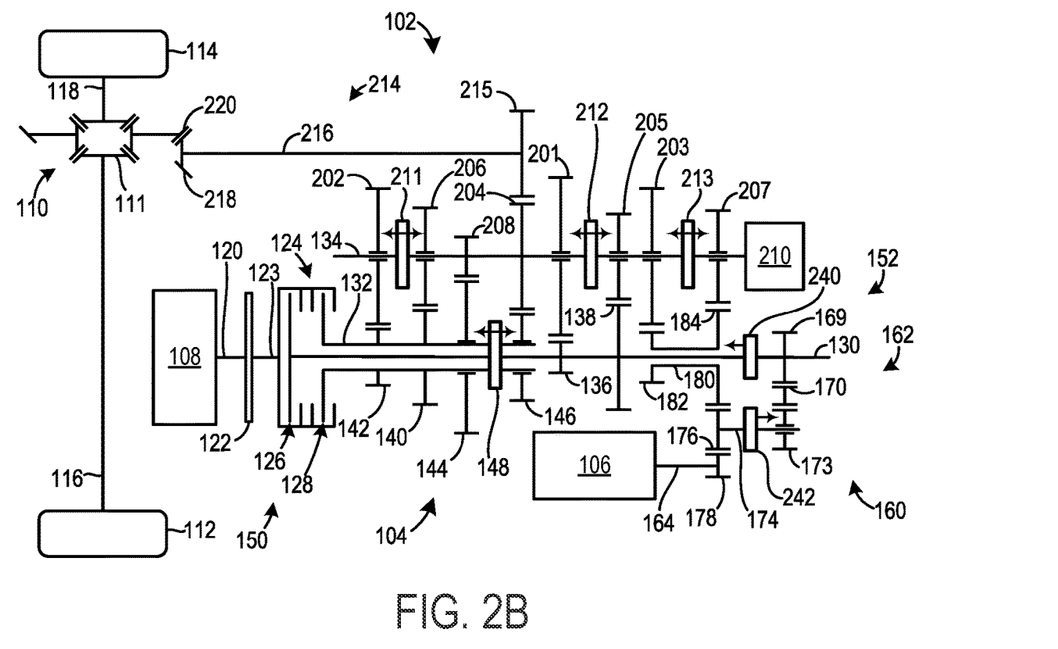
Figure 6:
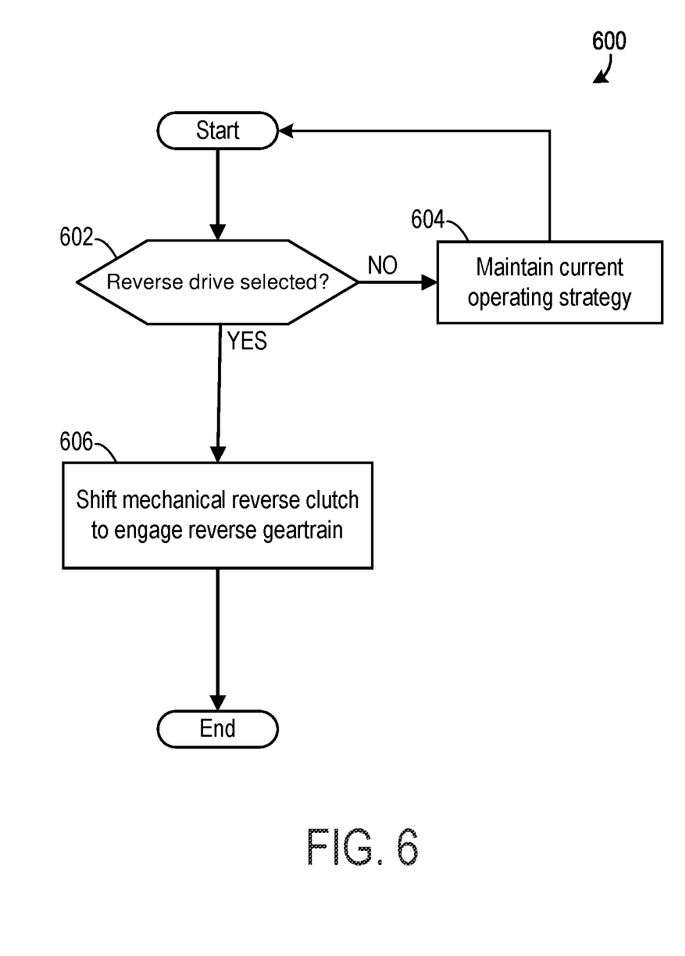
FIG. 6 shows a flowchart for a mechanical reverse shifting strategy in a transmission.
Figure 7:
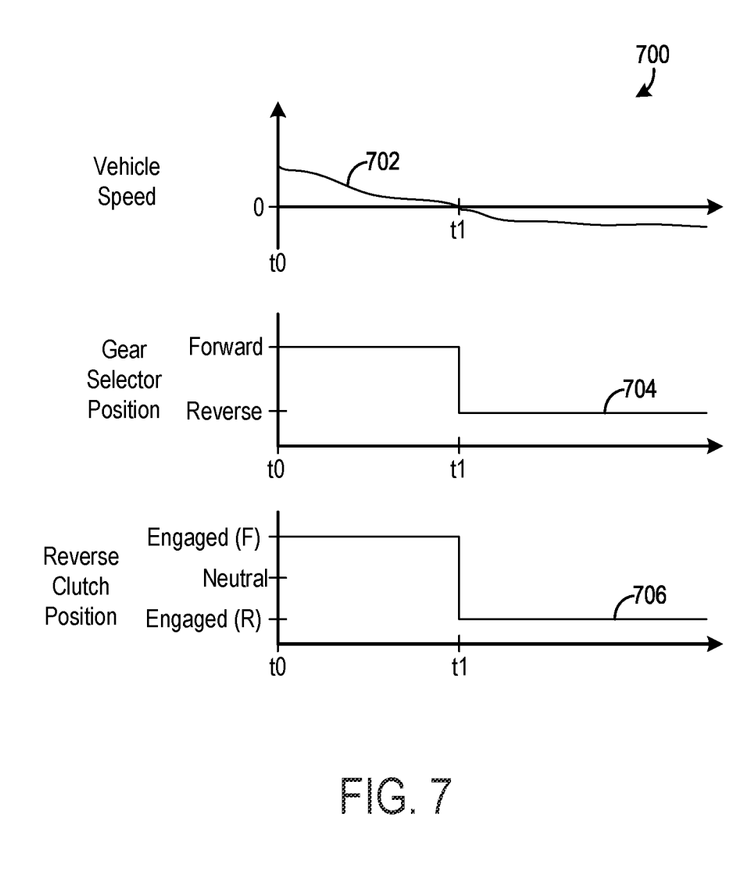
FIG. 7 shows a timing diagram of a use-case transmission control strategy for mechanically shifting into reverse.

FIG. 1 shows a schematic illustration of a vehicle with a hybrid drivetrain and transmission with a mechanical reverse assembly. FIGS. 2A-2B depict alternative configurations of the mechanical reverse assembly. FIGS. 3-5C illustrate power paths through the example drivetrain of FIG. 1 in different operating modes and gear selections, with FIGS. 5A-5C specifically depicting the transmission operating in three different reverse modes: a full internal combustion engine reverse mode; a hybrid reverse mode; and a full electric reverse, respectively. FIG. 6 illustrates a method for operating the vehicle in a reverse mode. FIG. 7 is a use-case timing diagram illustrative of a mechanical reverse shifting event.

FIG. 1 shows a schematic depiction of a vehicle 100 having a drivetrain 102 with a transmission 104. The vehicle may take a variety of forms in different embodiments, such as a light, medium, or heavy duty vehicle. To generate power, the drivetrain 102 may include an electric machine 106 (e.g., electric motor-generator) and an internal combustion engine (ICE) 108 (e.g., a spark and/or compression ignition engine). The electric machine 106 may include conventional components such as a rotor, stator, housing, and the like for generating mechanical power as well as electrical power, during a regeneration mode, in some cases. Further, the ICE 108 may include conventional components such as cylinder(s), piston(s), valves, a fuel delivery system, an intake system, an exhaust system, and the like. As such, the vehicle 100 may be a hybrid vehicle. In other examples, however, the vehicle may be an all-electric vehicle (EV) where the ICE is omitted and replaced with a second electric machine.

The transmission 104 may be configured to transfer torque between drive wheels 112, 114 and the electric machine 106 and/or the ICE 108. As such, the transmission 104 may be coupled to a differential 110 which provides torque to wheels 112, 114 by way of axle shafts 116, 118 respectively. The differential 110 may include a case 111 that houses a gearing arrangement such as pinion gears, spider gears, and the like to achieve the aforementioned torque transfer. To elaborate, the differential 110 may be any of an open differential, an electronic locking differential, an electronic limited slip differential, a torque vectoring dual clutch, and the like.

The ICE 108 may have an output shaft 120 that may be rotationally coupled to a flywheel 122. Further, a shaft 123 couples the flywheel 122 to a dual clutch assembly 124 in the transmission 104. Thus, the flywheel 122 serves as an ICE interface. Further, the dual clutch assembly 124 selectively rotationally couples the flywheel 122 to a first primary shaft 130 and a second primary shaft 132.

The dual clutch assembly 124 may include a first clutch mechanism 126 and a second clutch mechanism 128, which may be wet or dry friction clutches. The first clutch mechanism 126 may include a plurality of friction plates engageable to transfer torque from the flywheel 122 to the first primary shaft 130. As such, when the first clutch mechanism is engaged, the flywheel transfers torque to the first primary shaft. Similarly, the second clutch mechanism 128 may include friction plates which are engageable to transfer torque from the flywheel 122 to the second primary shaft 132. Thus, when the second clutch mechanism is engaged, the flywheel transfers torque to the second primary shaft. To increase the transmission's compactness, the second primary shaft may be hollow and disposed concentrically about the first primary shaft.

The dual clutch assembly may be operated to shift between multiple discrete gear ratios. To elaborate, the first clutch mechanism 126 may be operated for driving odd numbered gears (via the first primary shaft 130), while the second clutch mechanism 128 may be operated for driving even numbered gears (via the second primary shaft 132). Therefore, the first and second clutch mechanisms may be cooperatively engaged and disengaged or vice versa to transition between the transmission's operating gears. In particular, the dual clutch allows for smooth and efficient shifting operations between gears, since the operation of one clutch may be timed to engage an odd/even-numbered gear while another even/odd-numbered gear is being disengaged. In the example illustrated in FIG. 1, the transmission 104 may operate in eight discrete gear ratios, though other numbers of gear ratios have been contemplated. The arrangements of various gears on the first and second primary shafts 130, 132, and their corresponding meshing relationships with even and odd gears on a secondary shaft 134, are described in greater detail herein.

The first primary shaft 130 may include gears 136, 138 fixedly mounted thereon, and the second primary shaft 132 may include gears 140, 142 fixedly mounted thereon. Also, a double gear shaft 180 may be rotatably disposed around the first primary shaft 130. The double gear shaft 180 may include a gear 182 and a gear 184 disposed at opposing axial ends thereof. Further, gears 144, 146 may be rotatably mounted (e.g., idly mounted) on the second primary shaft 132. To rotatably attach the gear 144 to the shaft 132, a bearing 145 may be used. For the gear 146, as well as any other gears described herein as rotatably mounted on a shaft, that other similar bearings (e.g., roller bearings such as needle roller bearings) may be used to mount such gears on the corresponding shaft.

A coupling device 148 may be included on the second primary shaft 132 between the gears 144, 146 for selectively coupling one of the gears 144, 146 for rotation with the second primary shaft 132. For instance, in a first position, the coupling device 148 may lock the gear 144 for rotation with the shaft 132, and in a second position may lock the gear 146 for rotation with the shaft 132. The coupling device 148, as well as any other coupling device described herein, may be a dog clutch. For instance, the coupling device 148 may be a multi-face dog clutch that includes toothed surfaces on opposing axial sides of the clutch. These toothed surfaces may be shifted (left or right in the frame of reference of FIG. 1) to induce engagement between teeth on the corresponding gear (e.g., the gear 144 or gear 146, respectively). An actuator, such as a hydraulic actuator, electronic actuator (e.g., a solenoid), a pneumatic actuator, combinations thereof, and the like, may be used to shift the coupling device in this manner.

Additionally, or alternatively, the coupling device 148, as well as the other coupling devices described herein, may include a synchronization mechanism to achieve smooth clutch engagement during a shifting transient. To elaborate, the synchronization mechanism (or synchronizer) provides speed matching between the clutch and gear teeth. For instance, the synchronization mechanism may include a cone clutch and a blocking ring to accomplish this synchromesh functionality, which may reduce the chance of harsh shifts but may also increase system complexity. In other examples, any of the coupling devices may additionally or alternatively include a shift sleeve with splines profiled to mate with corresponding splines of a corresponding gear, when the shift sleeve is translated to engage a desired gear. The shift sleeve may thus be designed to axially translate when the coupling device shifts between gear ratios. In some cases, the coupling device(s) may include a shift sleeve which interacts with a synchronizer device such as, for instance, synchronizer rings designed to facilitate smooth power transfer during shifting transients. The synchronizer rings may, in some cases, include an annular body with external teeth at an outer diameter thereof and configured to engage with respective teeth of the shift sleeve, during certain conditions.

As previously mentioned, the drivetrain 102 may include an electric machine 106 in addition to the ICE 108. The electric machine 106 may be incorporated with or bolted to the transmission 104. Further, while the ICE 108, flywheel 122, and dual clutch assembly 124 may be provided proximate a first end 150 of the first primary shaft 130, the electric machine 106 may be positioned to provide rotational power to the transmission 104 near a second end 152 of the first primary shaft. In this way, a compactly arranged drivetrain through which one or both of the electric machine and the ICE may provide power to the transmission is provided.

The transmission 104 further includes a mechanical reverse assembly 162 with a reverse gearset 160. The arrangement of the reverse gearset 160, and a coupling device arranged therein, is configured to selectively provide a mechanical power path for effecting reverse drive operation (e.g., via power from the ICE 108). The reverse gear assembly may be designed to selectively mechanically couple the reverse gearset 160 to the first primary shaft 130 by operation of a coupling device 166. To accomplish the mechanical reverse functionality, the reverse gearset 160 of the mechanical reverse assembly 162 may include a driving gear 168 rotatably disposed on the first primary shaft 130 and in meshing engagement with an idle gear 170. The idle gear 170 may also be in meshing engagement with a gear 172 that is disposed on a first axial end of an idle shaft 174 of the electric machine 106. Further, a gear 176 may be disposed on a second axial end of the idle shaft 174 opposite the gear 172. The gear 176 may be in meshing engagement with a gear 178 on the output shaft 164 of the electric machine 106. Even further, the gear 176 on the idle shaft 174 may additionally be in meshing engagement with the gear 184 disposed on one end of the double gear shaft 180 proximate the second end 152 of the first primary shaft 130.

The coupling device 166 of the mechanical reverse assembly 162 may be positioned between the driving gear 168 and the gear 184 on the double gear shaft 180, and may be configured to selectively couple the driving gear 168 or the double gear shaft 180 for rotation with the first primary shaft 130. Thus, the coupling device 166 may be shifted to the left or right, as indicated by a double-ended arrow, to a first engagement position engaging the gear 184 (e.g., in a forward drive configuration) and a second engagement position engaging the driving gear 168 of the reverse gearset 160 (e.g., in a reverse drive configuration). For instance, when the coupling device 166 is in a neutral position, the gear 178 on the output shaft 164 of the electric machine may transmit rotational power from the output shaft to the gear 176 (on the idle shaft 174), and from the gear 176 to the gear 184 (on the double gear shaft 180). Thus, when the coupling device 166 is in neutral, rotational power from the electric machine 106 may bypass the first primary shaft 130 and arrive at the secondary shaft 134. However, when the coupling device 166 is shifted into the reverse drive configuration, the reverse gearset 160 (e.g., driving gear 168, idle gear 170, and gear 172) is rotationally coupled to the first primary shaft 130. Further, when the coupling device 166 is shifted into the forward drive configuration to engage the gear 184 on the double gear shaft 180, the output torque from of the electric machine is transmitted to the first primary shaft 130. As discussed above, the coupling device 166 may be a dog clutch, a sliding sleeve, or a synchronizer.

The transmission 104 may be configured to shift between several discrete gear ratios. In one example, the transmission may have eight gear ratios, although transmissions with an alternate number of gears have been contemplated. In order to accomplish this, the secondary shaft 134 may include eight gears positioned thereon selectively driven by gears positioned on the first primary shaft 130 or the second primary shaft 132 via operation of various coupling devices.

For example, a first ratio gear 201 may be rotatably mounted on the secondary shaft 134 and in meshing engagement with the gear 136 fixedly mounted on the first primary shaft 130. Similarly, a fifth ratio gear 205 may also be rotatably mounted on the shaft 134 and in meshing engagement with the gear 138 fixedly mounted on the first primary shaft 130. As described herein, the first and fifth ratio gears may be referred to as "the first gear" and "the fifth gear", with the same terminology being applied to each of the first through eighth gears. A coupling device 212 may be disposed on the secondary shaft between the first gear 201 and the fifth gear 205, and may be shifted to the left or right to engage the first gear 201 or the fifth gear 205, respectively, so as to lock the corresponding gear to the secondary shaft 134 for rotation therewith to operate the transmission at a first or fifth gear ratio, respectively.

A second gear 202 and a sixth gear 206 may be similarly rotatably mounted on the secondary shaft 134 and in meshing engagement with the gears 142 and 140, respectively, on the second primary shaft 132. A coupling device 211 may be positioned on the secondary shaft 134 between the second gear 202 and the sixth gear 206 and may be shifted to the left or right to engage the second gear 202 or the sixth gear 206, respectively, so as to lock to corresponding gear to the secondary shaft for rotation therewith to operate the transmission in a second or sixth gear ratio, respectively. Further, a fourth gear 204 and an eighth gear 208 may be fixedly mounted to the secondary shaft 134 and in meshing engagement with the gears 144 and 146, respectively. However, since the gears 144 and 146 are rotatably mounted on the second primary shaft 132, the coupling device 148 is shifted to the left or right to engage the gear 144 or the gear 146, respectively, so as to lock the corresponding gear to the second primary shaft. In this way, by operation of the coupling device 148, rotational energy may be transmitted from the gear 144 to the eighth gear 208 or from the gear 146 to the fourth gear 204 so as to operate the transmission in the eighth or fourth gear, respectively.

Further, a third gear 203 and a seventh gear 207 may be rotatably mounted on the secondary shaft 134 and selectively locked for rotation with the shaft 134 via operation of a coupling device 213 disposed therebetween. The third gear 203 and the seventh gear 207 may mesh with the gears 182 and 184, respectively, that are disposed on the double gear shaft 180 which is rotatably mounted on the first primary shaft 130. As previously discussed, the coupling device 166 in the mechanical reverse assembly 162 may be axially shifted (to the left) into a forward drive configuration where the coupling device 166 engages the gear 184, locking the double gear shaft 180 (and thus both of the gears 182 and 184) for rotation with the first primary shaft 130. As such, when the coupling device 166 is in the forward drive position, the coupling device 213 may be axially shifted to engage the third gear 203 or the seventh gear 207 to place the transmission 104 in a third or seventh gear ratio selection, respectively. Further, the coupling device 166, as well as any of the coupling devices (e.g., devices 148, 211, 212, and/or 213) may include dog clutches, synchronizers, sliding shift sleeves, combinations thereof, and the like.

As illustrated in FIG. 1, the even numbered gears (second gear 202, fourth gear 204, sixth gear 206, and eighth gear 208) may be disposed on the secondary shaft 134 so as to be selectively driven by the gears coupled to the second primary shaft 132, and the odd numbered gears (first gear 201, third gear 203, fifth gear 205, and seventh gear 207) may be disposed on the secondary shaft so as to be selectively driven by the gears coupled to the first primary shaft 130. In this way, the dual clutch assembly 124 can be operated to selectively couple the first or the second primary shaft to the engine output shaft 120, so that the transmission may efficiently shift between sequential gears. Further, the secondary shaft 134 may be positioned parallel to the first and second primary shafts 130, 132, with the even numbered gears 202, 204, 206, 208 disposed closer to the first end 150 of the first primary shaft 130 and the odd numbered gears 201, 203, 205, 207 positioned closer to the second end 152 of the first primary shaft.

The fourth gear 204 may be further coupled to a final drive arrangement 214. Specifically, the fourth gear 204 may be in meshing engagement with a drop gear 215 coupled at one axial end of a final drive shaft 216. Thus, rotational power may be transmitted through from the secondary shaft 134, via the fourth gear 204, to the final drive shaft 216 via the drop gear 215. The final drive shaft 216 may further include a gear 218 at an end opposite the drop gear 215. Further, the gear 218 may be in meshing engagement with a gear 220 disposed on the differential case 111 of the differential 110. Specifically, the gears 218, 220 may be constructed as a bevel or hypoid gearset. Further, the differential 110 may be operatively attached to the axle shafts 116, 118 in order to provide rotational power to the drive wheels 112, 114, respectively. As such, the differential 110 may distribute rotational driving force received from the drivetrain 102 to the drive wheels 112, 114, during certain operating conditions.

A park lock assembly 210 may also be coupled at one axial end of the secondary shaft 134, said axial end being proximal the axial end 152 of the first primary shaft 130. The park lock assembly 210 may be advantageously positioned coaxial to the secondary shaft 134, thereby in parallel with the first primary shaft 130 and the mechanical reverse coupling device 166, without affecting the overall package size (e.g., length) of the transmission 104, if wanted. In this way, the transmission may maintain a compact design while achieving park-lock functionality.

The first primary shaft 130, the second primary shaft 132, the secondary shaft 134, and the final drive shaft 216 (with drop gear 215 disposed thereon) may be disposed in a parallel arrangement. Further, the park lock assembly 210 may include a gearing and clutch arrangement that is disposed in parallel with the aforementioned shafts and engageable to keep the vehicle stationary by locking the secondary shaft 134 to prevent rotation thereof. In this way, the drivetrain 102 offers a compact transmission arrangement that is adaptable for incorporation into a variety of vehicle platforms and provides a mechanism which prevents unwanted movement when the vehicle is stationary.

The vehicle 100 may also include a control system 190 with a controller 191. The controller 191 includes a processor 192 and a memory 193. The memory 193 may hold instructions stored therein that when executed by the processor cause the controller 191 to perform various methods, control techniques, and the like described herein. The processor 192 may include a microprocessor unit and/or other types of circuits. The memory 193 may include known data storage mediums such as random access memory, read only memory, keep alive memory, combinations thereof, and the like.

The controller 191 may receive various signals from sensors 194 positioned in the vehicle 100 and the drivetrain 102. Conversely, the controller 191 may send control signals to various actuators 195 at different locations in the vehicle and transmission based on received signals and instructions stored in the memory 193 of the controller 191. For instance, the controller 191 may send command signals to the coupling device 166. Responsive to the coupling device 166 receiving the command signal, an actuator in the device may be used to shift the device into engagement with a desired gear to achieve a corresponding gear ratio selection in the transmission. The other controllable components in the transmission, and more generally the vehicle, may be operated in a similar manner with regard to sensor signals and actuator adjustment.

The coupling device 166 in FIG. 1 functions as a clutch for selectively transitioning between an engaged position for forward drive (e.g., engaging the gear 184 to lock the double gear shaft 180 for rotation with the first primary shaft 130), a neutral position, and an engaged position for mechanical reverse operation (e.g., locking the driving gear 168 of the reverse gearset 160 for rotation with the primary shaft 130). However, other configurations of the mechanical reverse assembly 162 have been envisioned for achieving the mechanical reverse functionality with two separate coupling devices. FIGS. 2A and 2B illustrate alternative coupling device arrangements within a mechanical reverse assembly in the transmission 104. The majority of the drivetrain 102 and the transmission 104 shown in FIGS. 2A and 2B, with the exception of the mechanical reverse assembly, is similar to the drivetrain and transmission depicted in FIG. 1. As such, the following discussion will focus on the altered arrangement of the mechanical reverse assembly located at the second end 152 of the first primary shaft 130 and redundant description of overlapping components is omitted for concision.

Turning to FIG. 2A, in one example, the mechanical reverse coupling device 166, as shown in FIG. 1, may be replaced by two separate coupling devices. In this example, a first coupling device 230 may be positioned on the first primary shaft 130 between the mechanical reverse driving gear 168 and the gear 184 (on the double gear shaft 180). The coupling device 230 may be configured to selectively shift into engagement with the gear 184 to lock the double gear shaft 180 (and gears 182, 184) for rotation with the primary shaft 130, in certain circumstances, whereby the electric machine 106 may transfer power directly to the secondary shaft 134, bypassing the first primary shaft 130, as previously discussed.

A second coupling device 232 may be disposed on the first primary shaft 130 proximate the end 152 thereof (e.g., between the mechanical reverse driving gear 168 and the end 152, or at the end 152). The second coupling device 232 may be configured to selectively shift into engagement with the driving gear 168, which is rotatably mounted on the first primary shaft 130, thereby locking the driving gear 168 for rotation with the first primary shaft. In this way, the mechanical reverse functionality may be realized solely by actuation of the second coupling device 232, if desired. For instance, when the second coupling device 232 is shifted into engagement with the driving gear 168, in either of a full ICE mode or a hybrid mode, the ICE 108 may transfer power to the reverse driving gear 168 via the first primary shaft 130. Power is then transferred through the reverse gearset 160 (e.g., sequentially from the driving gear 168, to the idle gear 170, the gear 172 on the idle shaft 174) and back into the transmission 104 via the double gear shaft 180. Next, the power may be transferred to the secondary shaft 134 via the third gear 203 (e.g., when coupling device 213 is shifted into engagement with the third gear) and transferred to the drive wheels 112, 114 by way of the final drive arrangement in the manner previously discussed. Repeated discussion of the power transfer through the final drive is omitted for brevity.

Using coupling device 232 as a dedicated mechanical reverse coupling allows the device to have a simpler and more compact design, if wanted, when compared to the double engagement coupling device 166, shown in FIG. 1.

Another example of the mechanical reverse coupling arrangement is depicted in FIG. 2B. In this example, the mechanical reverse driving gear 168, depicted in FIG. 1 as being rotatably mounted on the primary shaft 130, is replaced by a driving gear 169 which is fixedly coupled to the first primary shaft. Further, the gear 172, depicted in FIG. 1 as being fixed on the right end of the idle shaft 174, may be replaced by a gear 173 which is rotatably disposed on the idle shaft 174 at the right end thereof. A first coupling device 240 may be disposed on the first primary shaft 130 between the gear 184 (on the double gear shaft 180) and the fixed driving gear 169 of the mechanical reverse assembly 162. The first coupling device 240 may function similarly to the first coupling device 230 of FIG. 2A, such that shifting of the first coupling device 240 into an engaged position locks the double gear shaft 180 and, consequently, the gears 182, 184 mounted thereon to rotate with the first primary shaft 130. A second coupling device 242 may be positioned on the idle shaft 174 between the gears 176, 173. In this example, to achieve the mechanical reverse functionality, the second coupling device 242 may be axially shifted (to the right, in the frame of reference depicted in FIG. 2A) to engage the gear 173, thereby locking the gear 173 for rotation with the idle shaft 174. Thus, in either a full ICE or hybrid mode, rotational energy may be transferred from the ICE 108 through the first primary shaft 130 to the reverse driving gear 169, through the reverse gearset 160, and eventually through the transmission and to the drive wheels 112, 114 as discussed with reference to FIG. 2A. By using both the coupling device 240 and the coupling device 242, the coupling device 242 may be designed as a dedicated mechanical reverse coupling. Consequently, the coupling device 242 may be more compact than the coupling device 240, if wanted. Furthermore, in the transmission shown in FIG. 2B, the sliding sleeve engagement may be in the same leftward direction, which allows the axle to achieve additional compactness, if desired.

The coupling devices 230, 232 and 240, 242 of FIGS. 2A and 2B, respectively, may be similar to coupling device 166 depicted in FIG. 1, and as such may be a dog clutch, sliding sleeve, synchronizer, or combinations thereof. However, in some examples, since each of the coupling devices 230, 232, 240, 242 may be configured to be selectively shifted into engagement with only one gear, each device may include clutch interfaces on one axial side adjacent to the corresponding gear to be engaged, rather than including interfaces on both axial sides for engaging gears on each side.

Figure 3:
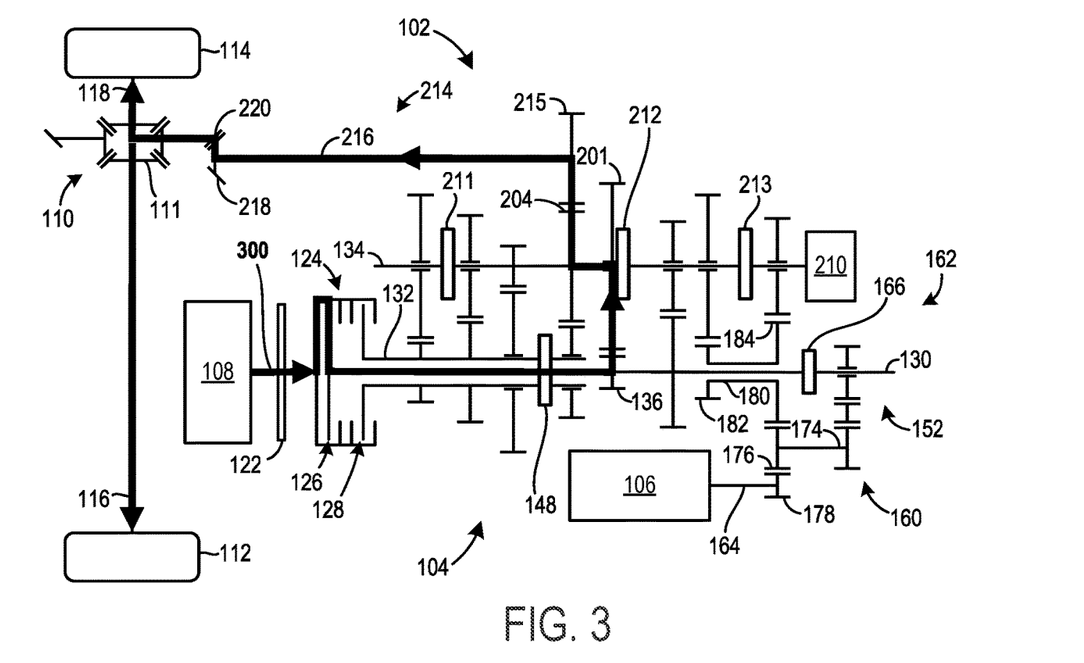
Figure 4:
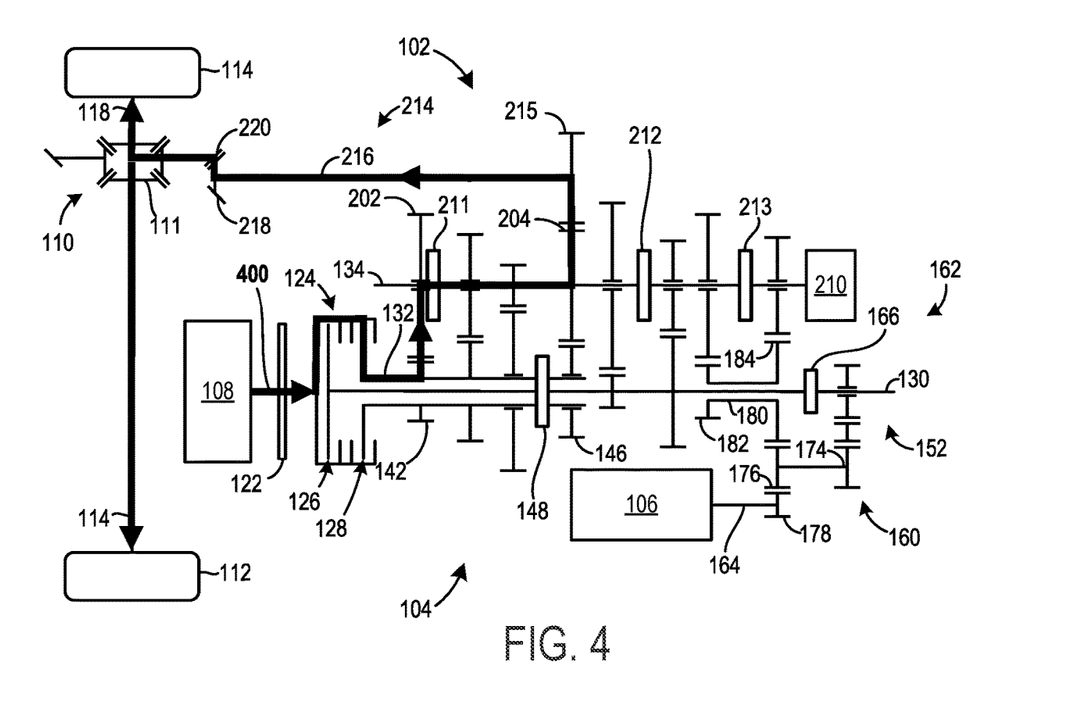
Figure 5A:
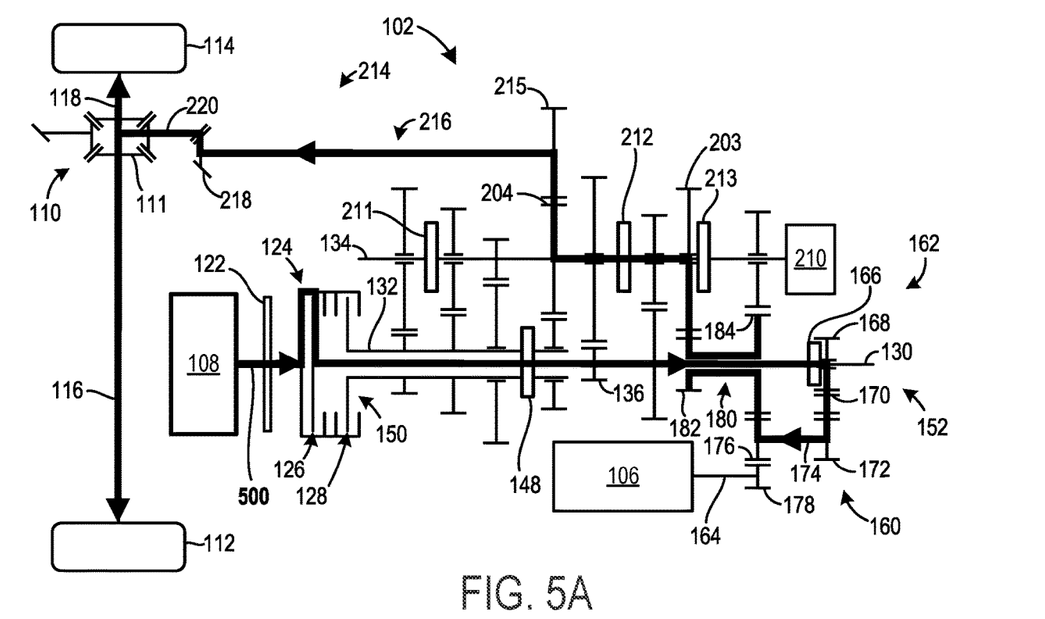
Figure 5B:
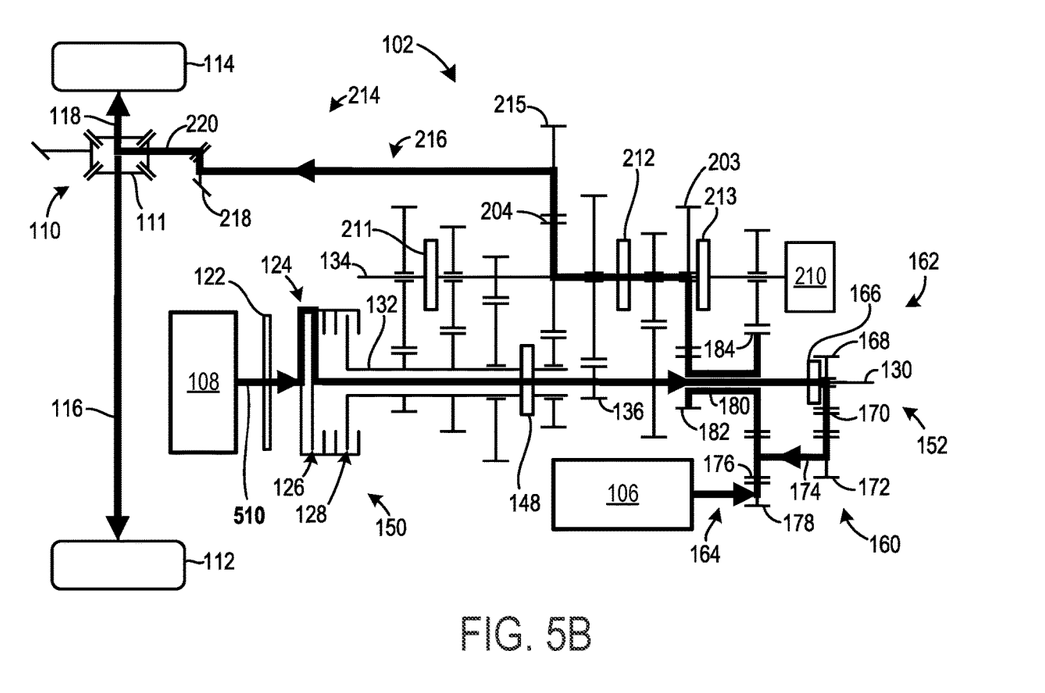
Figure 5C:
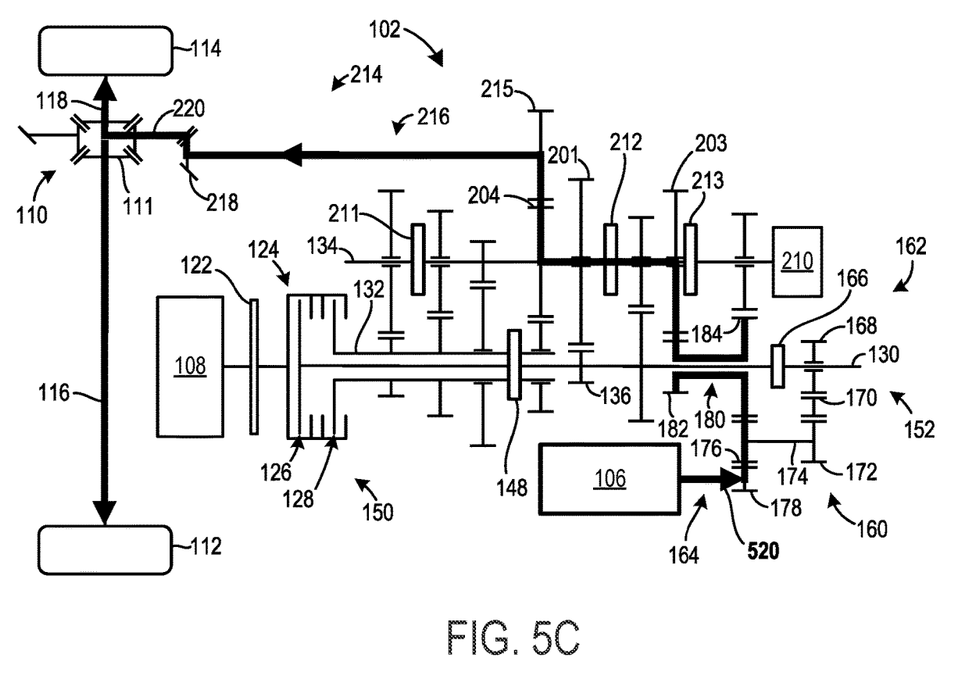

FIGS. 3-5C depict power paths through the transmission 104 of the drivetrain 102 to the drive wheels 112, 114 in different operating modes. In particular, the power paths illustrated in FIGS. 3 and 4 represent first and second forward drive gear ratio selections, respectively, in a full ICE driving mode, with the ICE 108 providing power to the transmission 104. FIGS. 5A-C illustrate reverse drive power paths through the transmission with the drivetrain operating in a full ICE mode, a hybrid mode, and a full EV mode, respectively. However, the drivetrain 102 may be operated in multiple modes which may include: a full ICE driving mode, multiple types of hybrid driving modes (e.g., a P2 and a P3 type hybrid mode), a full EV mode, a cranking mode, a kinetic energy recovery system (KERS) mode, a battery charging mode, and a mechanical reverse mode. As such, the power paths illustrated in FIGS. 3-5C may represent a selection of the available operating modes and the resultant power paths.

As previously indicated, the transmission may operate in multiple hybrid modes, as determined by the configuration of the coupling device 166 in the mechanical reverse assembly 162. As such, in a first type of hybrid drive mode (e.g., the P2 type hybrid mode), the coupling device 166 of the mechanical reverse assembly may be in its forward drive position in which the gear 184 is rotationally coupled the double gear shaft 180 (to which the gear 184 is coupled) for rotation with the first primary shaft 130. In a second type of hybrid drive mode (e.g., the P3 type hybrid mode), the coupling device 166 may be in the neutral position where neither gear 184 nor gear 168 is engaged by the coupling device 166. As such, in the second hybrid mode, torque from the electric machine 106 bypasses the first primary shaft 130 and arrives at the secondary shaft 134.

In the full EV mode, the dual clutch assembly 124 may disconnect the flywheel 122 from the first and second primary shafts 130, 132 and the coupling device 166 may transfer power from the electric machine 106 to the first or second primary shafts. In the cranking mode, power may be transferred from the electric machine 106 to the ICE 108 to initiate combustion operation.

In the KERS mode, mechanical power from the transmission 104 may be transferred to the electric machine 106 and in turn the electric machine generates electrical energy for traction battery charging and/or use in electrically powered auxiliary systems. In the battery charging mode, the ICE 108 may transfer mechanical power to the electric machine 106 and the electric machine will in turn operate to generate electrical energy for traction battery charging.

Turning to FIG. 3, the drivetrain 102 is illustrated operating in a first gear ratio in a full ICE drive mode, with a first gear power path 300. Specifically, in the first gear mode, the first clutch mechanism 126 in the dual clutch assembly 124 is engaged to lock the flywheel 122 of the ICE 108 for rotation with the first primary shaft 130, and the coupling device 212 locks the first gear 201 for rotation with the secondary shaft 134. Further, the coupling device 166 in the mechanical reverse assembly 162 may be in a neutral position.

The first gear full ICE forward drive power path 300 unfolds as follows: power is transferred from the flywheel 122 of the ICE 108 via the dual clutch assembly 124 (e.g., the first clutch mechanism 126) to the first primary shaft 130. Next, the power path 300 moves through the first primary shaft 130 to the first gear 201, by way of the gear 136 fixed to the first primary shaft, and continues to flow through the secondary shaft 134 to the fourth gear 204. Next, power is transferred from the fourth gear 204 to the final drive shaft 216 by way of the drop gear 215 in the final drive arrangement 214. Thus, from the shaft 216, power is transferred to the differential 110 and then to drive wheels 112, 114 via the axle shafts 116, 118, respectively.

FIG. 4 depicts the drivetrain 102 operating in a second gear ratio in a full ICE drive mode, with a second gear power path 400. Specifically, in the second gear ratio mode, the second clutch mechanism 128 of the dual clutch assembly 124 couples the flywheel 122 of the ICE 108 for rotation with the second primary shaft 132, and the coupling device 211 locks the second gear 202 for rotation with the secondary shaft 134. Again, the coupling device 166 in the mechanical reverse assembly 162 may be in a neutral position.

The power path 400 unfolds as follows: power is transferred from the flywheel 122 to the dual clutch assembly 124 (e.g., the second clutch mechanism 128) to the second primary shaft 132. Next, the power flows through the second primary shaft 132 to the gear 142, whereby torque is transferred to the secondary shaft 134 via the second gear 202. Next, the power is transferred through the secondary shaft 134 and to the fourth gear 204, where power then flows to the final drive shaft 216 by way of the drop gear 215, and flows to the differential 110 and then to the drive wheels 112, 114 via the axle shafts 116, 118, respectively.

Shifting the transmission 104 from the first gear ratio selection with power path 300 shown in FIG. 3 to the second gear ratio selection with the power path 400 in FIG. 4 may occur rapidly due to the configuration of the dual clutch assembly 124. Specifically, disengagement of the first clutch mechanism in the dual clutch assembly 124 may be timed to occur in tandem with engagement of the second clutch mechanism 128, when shifting from the first gear to the second gear, thus providing a seamless transition of the power input from the ICE 108 into the transmission as other coupling devices therein are shifted into their appropriate configurations.

FIG. 5A depicts the transmission 104 operating in a full ICE mechanical reverse mode with an associated power path 500. Specifically, in this mechanical reverse mode, the first clutch mechanism 126 may couple the flywheel 122 of the ICE 108 to the first primary shaft 130, the coupling device 166 may couple the driving gear 168 of the reverse gearset 160 to the first primary shaft 130, and the coupling device 213 may couple the third gear 203 to the secondary shaft 134. Thus, the third gear ratio may be activated in the mechanical reverse mode.

The power path 500 unfolds as follows: power is transferred from the ICE 108, via the flywheel 122 and the dual clutch assembly 124, to the first primary shaft 130. Next, power flows through the first primary shaft to the driving gear 168 of the mechanical reverse assembly 162 and is then transferred to the idle gear 170 and to the idle shaft 174 by way of the gear 172 mounted thereon. Next, the power path reenters the transmission 104, by way of the gear 176 mounted on the idle shaft 174 transferring torque to the gear 184 on the double gear shaft 180. The power then flows from the gear 182 on the double gear shaft 180 to the third gear 203. Next, the power flows through the secondary shaft 134 to the fourth gear 204, and is subsequently transferred to the final drive shaft 216 by way of the drop gear 215. From the shaft 216, power is transferred to the differential 110 and then to drive wheels 112, 114 via the axle shafts 116, 118, respectively.

FIG. 5B depicts the transmission 104 operating in a hybrid mechanical reverse mode with an associated power path 510. As described with reference to FIG. 5A, the first clutch mechanism 126 of the dual clutch assembly 124 again couples the flywheel 122 of the ICE 108 to the first primary shaft 130. Further, the coupling device 166 in the mechanical reverse assembly 162 couples the driving gear 168 of the reverse gearset 160 to the first primary shaft 130, and the coupling device 213 couples the third gear 203 to the secondary shaft 134. However, in contrast to the full ICE reverse mode depicted in FIG. 5A, the power path 510 in the hybrid reverse mode depicted in FIG. 5B is provided with power input from both the ICE 108 and the electric machine 106.

The power path 510 unfolds as follows: power is transferred from the ICE 108, via the flywheel 122 and the dual clutch assembly 124, to the first primary shaft 130, whereby the power flows through the first primary shaft to the driving gear 168 of the mechanical reverse assembly 162 and is then transferred to the idle gear 170 and to the idle shaft 174 by way of the gear 172 mounted thereon. The power path then arrives at the gear 176 mounted on the idle shaft 174. Simultaneously, power may be transferred from the electric machine 106 to the gear 176 via the output shaft 164 of the electric machine. Next, the combined power from the ICE 108 and the electric machine 106 is transferred from the gear 176 to the gear 184 on the double gear shaft 180. The power then flows from the gear 182 on the double gear shaft 180 to the third gear 203. Next, the power flows through the secondary shaft 134 to the fourth gear 204, and is subsequently transferred to the final drive shaft 216 by way of the drop gear 215. From the shaft 216, power is transferred to the differential 110 and then to drive wheels 112, 114 via the axle shafts 116, 118, respectively.

FIG. 5C depicts the transmission 104 operating in a full electric reverse mode with an associated power path 520. Specifically, in the electric reverse mode, the flywheel 122 of the ICE 108 is decoupled from the transmission 104. To achieve this decoupling the first and second clutch mechanisms 126, 128 are disengaged and prevent power flow from the flywheel to the first or second primary shafts, respectively. Further, the coupling device 213 couples the third gear 203 to the secondary shaft 134. Additionally, in the illustrated example, the coupling device 166 of the mechanical reverse assembly 162 is arranged in a neutral position. Alternatively, the coupling device 166 may be in the engaged positon where the gear 168 is coupled for rotation with the first primary shaft 130. In such an example, the power path in the full electric reverse mode may flow from the electric machine 106 to the reverse gearset 160, from the reverse gearset to the first primary shaft 130, and from the first primary shaft to the gear 136, from the gear 136 to the secondary shaft 134 by way of the gear 201, and from the secondary shaft 134 to the final drive arrangement 214. Further, in such an example, the coupling device 212 engages the gear 201 such that it corotates with the secondary shaft 134 and the coupling device 213 is in its disengaged position.

The power path 520 unfolds as follows: power is transferred from the electric machine 106 to the gear 176 on the idle shaft 174 by way of the gear 178 fixed to the electric machine output shaft 164. Next, power is transmitted from the gear 176 to the gear 184. The power then flows through the double gear shaft 180 to the gear 182 mounted thereon, and from the gear 182 to the third gear 203. Next, the power flows through the secondary shaft 134 to the fourth gear 204, and is subsequently transferred to the final drive shaft 216 by way of the drop gear 215. From the shaft 216, power is transferred to the differential 110 and then to drive wheels 112, 114 via the axle shafts 116, 118, respectively. In the example shown in FIG. 5C, with the coupling device 166 in a neutral position, the power path 520 bypasses the first primary shaft 130 by way of the double gear shaft 180. However, when the coupling device 166 is shifted to engage the gear 184, locking the double gear shaft 180 for rotation with the first primary shaft, another electric reverse power path may be realized by, for instance, transmitting power from the electric machine to the first primary shaft 130 and then to the first gear 201 (e.g., when the coupling device 212 locks the first gear 201 for rotation with the secondary shaft 134) and through the final drive arrangement 214 as previously described.

The arrangement of the mechanical reverse gearset 160, particularly the idle gear 170 and coupling device arrangement, allows the mechanical reverse assembly 162 to transmit power (e.g., from the ICE) through the transmission to the drive wheels to mechanically achieve reverse drive functionality. In this way, the transmission 104 may not necessarily rely solely on the electric machine to achieve reverse drive, which may be desirable when a battery that provides electrical power to the electric machine has a low SOC, for instance. Thus, the transmission is able to achieve reverse drive in multiple configurations and a more robust system is provided with consistently available reverse drive functionality in the different modes of vehicle operation.

The alternative coupling device arrangements shown in the mechanical reverse assemblies of FIGS. 2A-2B may also be operated to provide a power path similar to the power paths for the full ICE and hybrid reverse driving modes shown in FIGS. 5A-5B. For instance, the coupling device 232 in FIG. 2A may be shifted into engagement with the driving gear 168 to couple the reverse gearset to the first primary shaft, and the coupling device 242 in FIG. 2B may be shifted into engagement with the gear 173 on the idle shaft 174 in order to couple the reverse gearset to the first primary shaft, in order to realize a similar mechanical reverse power path through the transmission.

FIG. 6 shows a method 600 for operating a vehicle with an electric machine and a mechanical reverse geartrain integrated in the drivetrain, such as the vehicle 100 and/or drivetrain 102 depicted in FIGS. 1 and 3-5C. The method 600 may be executed by the controller 191 shown in FIG. 1. Alternatively, the method 600 may be implemented by another suitable controller, vehicle system, and corresponding components. Further, instructions for carrying out the method 600 may be executed by a controller based on instructions stored on a memory unit of the controller and in conjunction with signals received from the vehicle system. The controller may employ actuators to adjust vehicle operation, according to the method described below.

At 602, the method determines whether reverse drive has been selected. This step may include determining the position of a gear selector or similar device operated by a vehicle operator, to determine whether forward or reverse drive operation is desired. Reverse drive has not been selected (NO at 602), the method moves to 604 where the current operating strategy for the vehicle is maintained. This may involve maintaining the vehicle in forward drive, maintaining the vehicle in park, and the like.

If reverse drive is selected (YES at 602), the method moves to 606 where the coupling device (e.g., dog clutch, sliding sleeve, synchronizer, combinations thereof, and the like) in the mechanical reverse assembly is shifted from the forward drive engagement position or neutral position into the reverse drive engagement position where the mechanical reverse gearset is coupled to the primary shaft of the transmission. Further, shifting the coupling device to engage the reverse gearset may occur at a time when the vehicle is operating in a full ICE mode, full EV mode, or a hybrid mode. In this way, the mechanical reverse may be activated over a wider range of operating modes, in comparison to previous hybrid transmissions. The method may further include, while the vehicle is substantially stationary and the ICE and electric machine are shutdown, engaging the park lock device in response to operator interaction with an input device (e.g., a park lock selector). In this way, the park lock may be engaged when desired by an operator.

FIG. 7 illustrates a timing diagram 700 of a use-case control strategy for operating a vehicle in the mechanical reverse mode. In each plot of the timing diagram, time is indicated on the abscissa and increases in the direction of the arrow. The ordinate for plot 702 indicates the vehicle speed and increases in the direction of the arrow. The ordinate of plot 704 indicates the position of a gear selector (forward drive or reverse drive), and the ordinate of plot 706 indicates the position of the mechanical reverse coupling device (forward drive engaged (F), neutral, or reverse drive engaged (R)), as previously discussed with regard to coupling device 166 of FIG. 1 in the mechanical reverse assembly 162.

From t0 to t1, vehicle speed decreases while the vehicle is operating in a forward drive mode and the mechanical reverse coupling device is in the forward drive engaged position. In some cases, however, the mechanical reverse coupling device may be in a neutral position from t0 to t1, during some forward drive operations (e.g., depending on the active gear ratio selection). At t1, when the vehicle speed reaches zero and the operator adjusts the gear selector into a reverse drive position, the mechanical reverse coupling device is shifted (e.g., automatically shifted) into the reverse drive engaged position, engaging the mechanical reverse assembly to couple the reverse gearset to the transmission's first primary shaft. Thus, at t1, the vehicle speed continues to decrease below zero as reverse drive is activated. Further, when the driver subsequently selects a forward drive position of the gear selector, the reverse coupling device will be similarly automatically shifted from the reverse drive engaged position into one of the neutral or forward drive again positions, again allowing for a hybrid, full ICE, or full EV forward drive mode to be implemented.

The technical effect of the mechanical reverse assembly in the hybrid transmission described herein is to provide a mechanical reverse functionality for reverse drive operation which can be effected in a hybrid drive mode, full ICE mode, and full EV mode. In this way, a vehicle operator may confidently drive the vehicle in reverse as desired via the ICE and/or the electric machine, reducing the chance of reverse operation becoming unavailable (e.g., due to a low battery SOC). As such, the transmission may be operated in reverse even if the traction battery has a low SOC or if the ICE is low on fuel. Further, the mechanical reverse geartrain as described herein may be incorporated into a transmission without significantly increasing the size or weight of the transmission.

FIGS. 1-5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, a transmission system is provided that comprises a mechanical reverse assembly including a reverse gearset that comprises at least a first gear on a first primary shaft and a second gear that is torsionally coupled to an output shaft of an electric machine and the first primary shaft; wherein the mechanical reverse assembly includes a coupling device; and wherein the coupling device is designed to: in a reverse drive configuration, mechanically attach the reverse gearset to the first primary shaft.

In another aspect, a transmission in a hybrid drivetrain is provided that comprises a mechanical reverse assembly designed to be engaged in each of a hybrid mode, a full electric vehicle (EV) mode, and a combustion engine mode, wherein the mechanical reverse assembly includes a reverse gearset with a drive gear on a first primary shaft and a driving gear that is torsionally coupled to an output of an electric machine; and an internal combustion engine interface selectively rotationally coupled to a first primary shaft; wherein the reverse gearset includes a gear on the first primary shaft, an idle gear, and a gear on an idle shaft of the electric machine; wherein the mechanical reverse assembly includes a coupling device; and wherein the coupling device is designed to: in a reverse drive configuration, mechanically attach the reverse gearset to the first primary shaft.

In yet another aspect, a method for operation of a transmission system is provided that comprises, in any of a full electric vehicle (EV) mode, a full internal combustion engine (ICE) mode, or a hybrid mode, mechanically shifting a mechanical reverse assembly through operation of a coupling device to mechanically engage a reverse gearset with a first primary shaft; wherein the reverse gearset includes a driving gear that meshes with a gear on an idle shaft that is mechanically driven by an electric machine. In one example, during shutdown of the electric machine and an internal combustion engine in the transmission system, the method may include engaging a park lock device coupled to a secondary shaft that includes one or more sets of gears that mesh with one or more sets of gears on the first primary shaft. In another example, the method may further comprise operating a dual clutch to shift between a plurality of discrete gears, wherein the dual clutch is coupled to an engine flywheel, in a first position rotationally couples the engine flywheel to the first primary shaft, and in a second position rotationally couples the engine flywheel to a second primary shaft. In yet another example, shifting between a plurality of discrete gears may include engaging a first synchronizer to rotationally couple a gear on the first primary shaft with a gear on a secondary shaft. In another example, mechanical shifting the mechanical reverse assembly through operation of the coupling device may include: transitioning a first sleeve in a neutral position; and transitioning a second sleeve into position that rotationally engages the driving gear and the first primary shaft.

In any of the aspects or combinations of the aspects, the coupling device may be configured to, in an engaged configuration, rotationally couple the output shaft and the first primary shaft via a pair of forward drive gears, and in a neutral configuration, rotationally couple the output shaft and a secondary shaft.

In any of the aspects or combinations of the aspects, the transmission system may further comprise a controller including instructions that when executed cause the controller to: automatically shift the coupling device from the neutral configuration or the engaged configuration into the reverse configuration.

In any of the aspects or combinations of the aspects, the coupling device may be automatically shifted in any of a full electric vehicle (EV) mode, a full internal combustion engine (ICE) mode, or a hybrid mode.

In any of the aspects or combinations of the aspects, the coupling device may include a synchronizer mounted on the first primary shaft.

In any of the aspects or combinations of the aspects, the transmission system may further comprise a dual clutch coupled to an engine flywheel and selectively rotationally coupling the engine flywheel to the first primary shaft and a second primary shaft.

In any of the aspects or combinations of the aspects, the mechanical reverse assembly may include a driving gear on the first primary shaft, an idle gear, and a driven gear sequentially meshing with one another.

In any of the aspects or combinations of the aspects, the transmission system may further comprise a park lock assembly coupled to a secondary shaft in parallel with the coupling device.

In any of the aspects or combinations of the aspects, the coupling device may include: a first sleeve coupling designed to selectively engage the reverse gearset and the first primary shaft; and a second sleeve coupling designed to selectively engage a double gear with the first primary shaft.

In any of the aspects or combinations of the aspects, the transmission system may further comprise a controller including instructions that when executed, during a transition from a reverse drive mode to a hybrid drive mode, cause the controller to automatically shift the coupling device from the reverse configuration to an engaged configuration.

In any of the aspects or combinations of the aspects, the transmission may further comprise a drop gear rotationally coupling a secondary shaft to a differential, wherein the secondary shaft includes a plurality of gears that mesh with gears on the first primary shaft.

In any of the aspects or combinations of the aspects, the internal combustion engine interface may be positioned on a first axial end of the first primary shaft and the mechanical reverse assembly may be positioned on a second axial end of the first primary shaft.

In any of the aspects or combinations of the aspects, the transmission may further comprise a park lock assembly coupled to an end of a secondary shaft spaced away from the internal combustion engine interface.

In any of the aspects or combinations of the aspects, the internal combustion engine interface may be a flywheel and the transmission may further comprise a dual clutch coupled to the flywheel and selectively coupled to the first primary shaft and a second primary shaft.

In any of the aspects or combinations of the aspects, the mechanical reverse assembly may include at least two coupling devices.

In any of the aspects or combinations of the aspects, the mechanical reverse assembly may include at least two coupling devices arranged on distinct shafts.

In another representation, a hybrid dual-clutch transmission is provided with a mechanical reverse system that is designed to engage a reverse gearset in each of a hybrid mode, an all-electric mode, and full internal combustion engine mode, where the reverse gearset includes: a driven gear selectively coupled to a first end of the primary shaft, an idle gear, and a gear on an idler shaft of an electric motor, where an internal combustion engine is coupled to a second end of the primary shaft and where the second end of the primary shaft is opposite the first end.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various powertrain hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to hybrid vehicles with various engine types such as V-6, I-4, I-6, V-12, opposed 4, and other suitable types of engines. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
a mechanical reverse assembly including a reverse gearset that comprises at least a first gear on a first primary shaft and a second gear that is torsionally coupled to an output shaft of an electric machine and the first primary shaft;
wherein the mechanical reverse assembly includes a coupling device;
wherein the coupling device is designed to:
in a reverse drive configuration, mechanically attach the reverse gearset to the first primary shaft; and
wherein the coupling device includes:
a first sleeve coupling designed to selectively engage the reverse gearset and the first primary shaft; and
a second sleeve coupling designed to selectively engage a double gear with the first primary shaft.

2. The transmission system of claim 1, wherein the coupling device is designed to, in a forward drive configuration, rotationally couple the output shaft and the first primary shaft via a pair of forward drive gears, and in a neutral configuration, rotationally couple the output shaft and a secondary shaft.

3. The transmission system of claim 2, further comprising:
a controller including instructions that when executed cause the controller to:
automatically shift the coupling device from the neutral configuration or the forward drive configuration into the reverse drive configuration.

4. The transmission system of claim 3, wherein the coupling device is automatically shifted into the reverse drive configuration in any of a full electric vehicle (EV) mode, a full internal combustion engine (ICE) mode, and a hybrid mode.

5. The transmission system of claim 1, wherein the coupling device includes a synchronizer mounted on the first primary shaft.

6. The transmission system of claim 1, further comprising a dual clutch coupled to an engine flywheel and selectively rotationally coupling the engine flywheel to the first primary shaft and a second primary shaft.

7. The transmission system of claim 1, wherein the mechanical reverse assembly includes a driving gear on the first primary shaft, an idle gear, and a driven gear sequentially meshing with one another.

8. The transmission system of claim 1, further comprising a park lock assembly coupled to a secondary shaft that is arranged parallel to the coupling device.

9. The transmission system of claim 1, further comprising:
a controller including instructions that when executed, during a transition from a reverse drive mode to a forward drive mode, cause the controller to:
automatically shift the coupling device from the reverse drive configuration to a forward drive configuration.

10. A transmission in a hybrid drivetrain, comprising:
a mechanical reverse assembly designed to be engaged in each of a hybrid mode, a full electric vehicle (EV) mode, and a combustion engine mode, wherein the mechanical reverse assembly includes a reverse gearset with a drive gear on a first primary shaft and a driving gear that is torsionally coupled to an output of an electric machine; and
an internal combustion engine interface selectively rotationally coupled to the first primary shaft;
wherein the reverse gearset includes the drive gear on the first primary shaft, an idle gear, and a gear on an idle shaft of the electric machine;
wherein the mechanical reverse assembly includes a coupling device;

wherein the coupling device is designed to:
in a reverse drive configuration, mechanically attach the reverse gearset to the first primary shaft; and
wherein the internal combustion engine interface is a flywheel and the transmission further comprises a dual clutch coupled to the flywheel and selectively coupled to the first primary shaft and a second primary shaft.

11. The transmission of claim 10, wherein the mechanical reverse assembly includes at least two coupling devices arranged on distinct shafts.

12. The transmission of claim 10, wherein the internal combustion engine interface is positioned on a first axial end of the first primary shaft and the mechanical reverse assembly is positioned on a second axial end of the first primary shaft.

13. The transmission of claim 10, further comprising a park lock assembly coupled to an end of a secondary shaft spaced away from the internal combustion engine interface.

\* \* \* \* \*